UNITED STATES PATENT OFFICE.

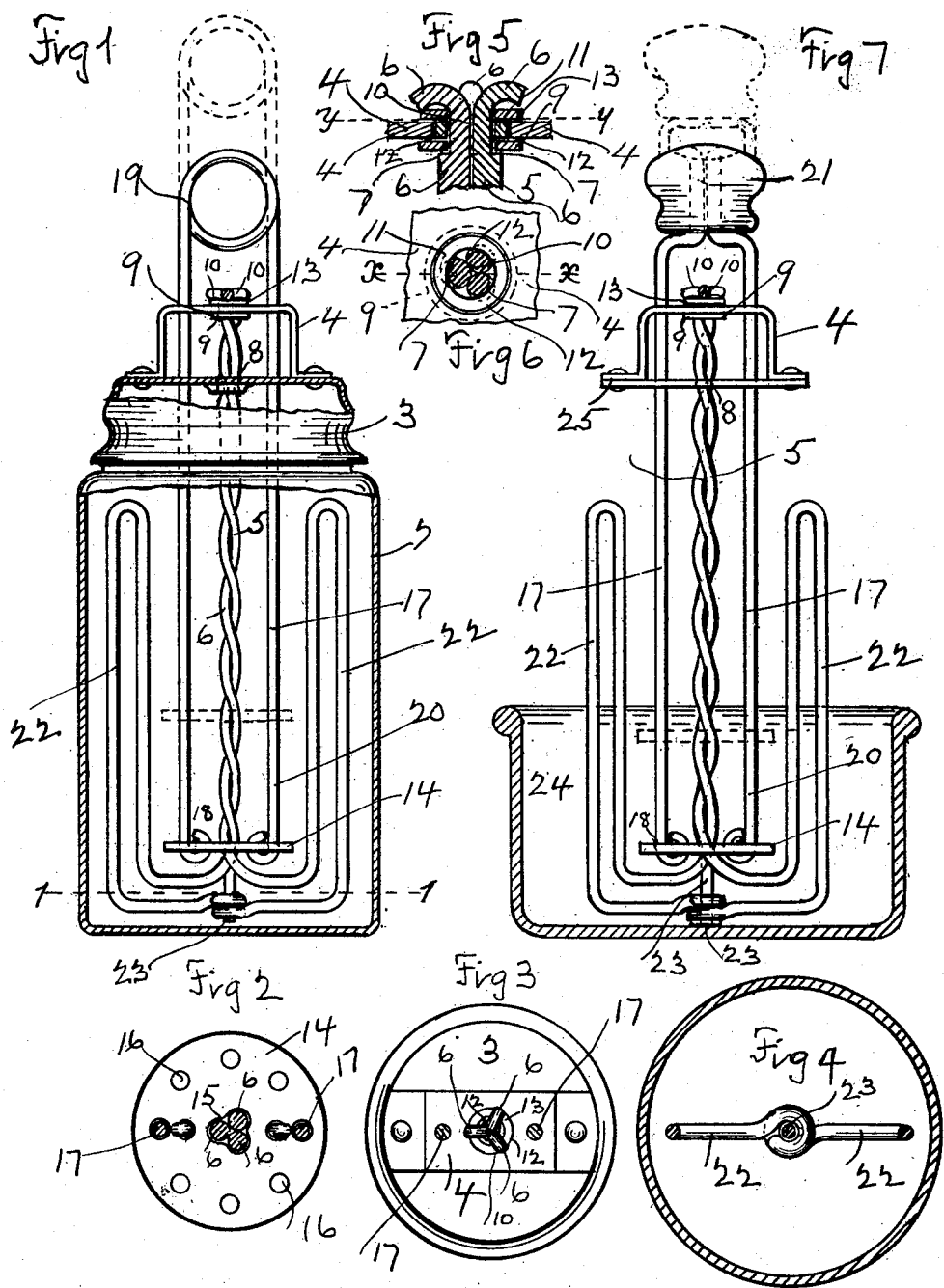

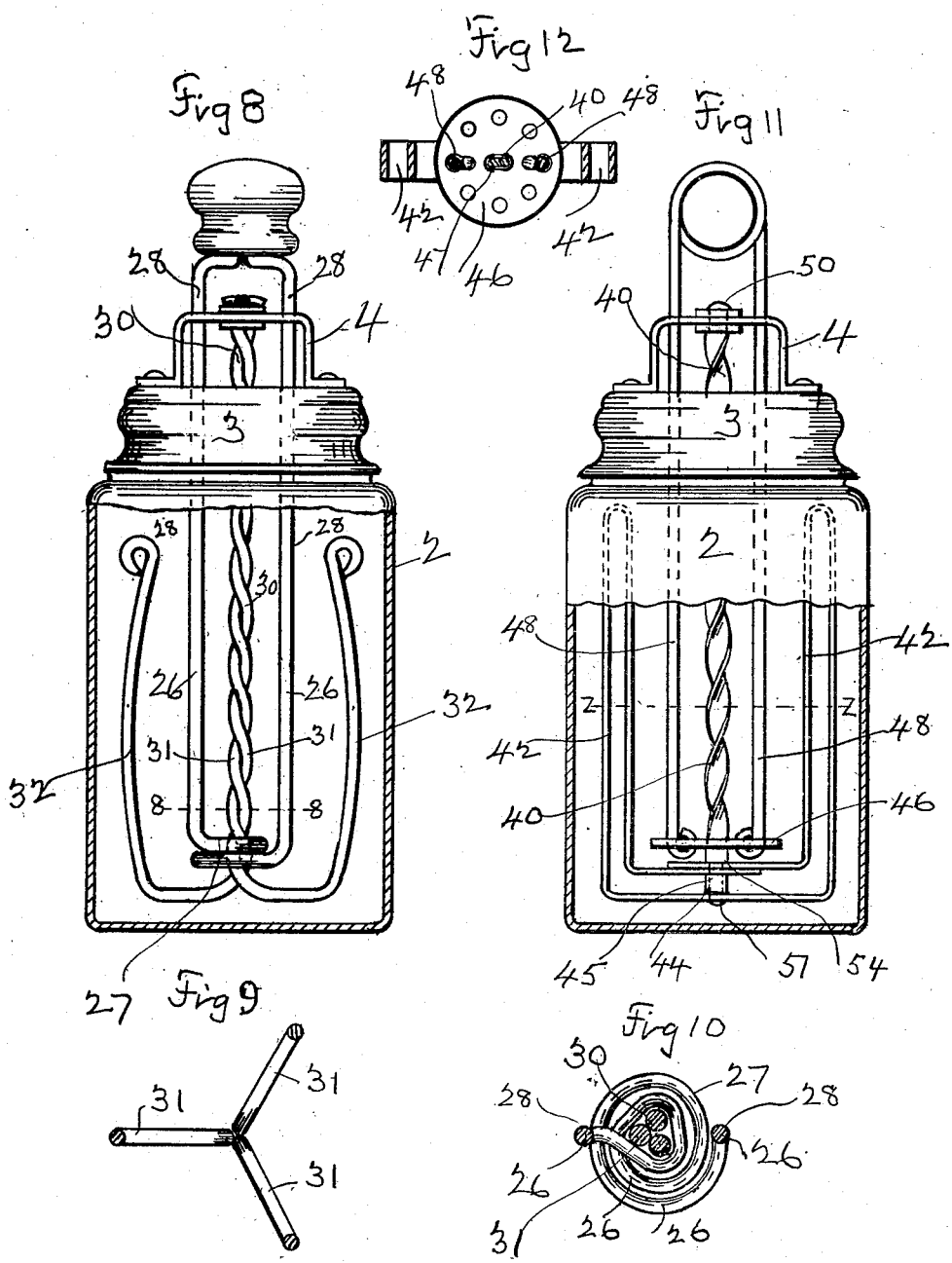

PAUL TRIPKE, OF JERSEY CITY, NEW JERSEY.

EGG BEATER AND MIXER.

1,274,634.     Specification of Letters Patent.     Patented Aug. 6, 1918.

Application filed August 10, 1914. Serial No. 856,088.

*To all whom it may concern:*

Be it known that I, PAUL TRIPKE, citizen of the United States, and resident of Jersey City, in the county of Hudson and State of New Jersey, have invented certain new and useful Improvements in Egg Beaters and Mixers, of which the following is a specification.

My invention relates to egg beaters and mixers and the object is to produce a beater and mixer of this class, wherein the upward and downward movement of the churning dasher on the spiral stem, co-actingly acts as a motor to revolve the same and its beater-arms or members.

Referring to the drawing—

Figure 1 is an elevation of my improved egg beater or mixer (partly in section) operating within a closed vessel.

Fig. 2 is a detached plan view of the dasher (enlarged), the screw shown in section.

Fig. 3 is a plan view of the cover.

Fig. 4 is a plan section on line 1. 1. Fig. 1 showing the manner of fastening the beater arms to the screw.

Fig. 5 is a fragmentary sectional view on line X X Fig. 6 of the upper end of the screw and bridge showing the manner of pivotally attaching the screw to the cover or bridge.

Fig. 6 is a plan sectional view of Fig. 5 on line Y Y.

Fig. 7 is another elevation of my egg beater showing how the same operates within a coverless vessel.

Fig. 8 is an elevation of a modified form of the beater.

Fig. 9 is a bottom view of the beater arms as shown in Fig. 8.

Fig. 10, is a section on line 8. 8. Fig. 8 showing a plan view of the dasher, enlarged.

Fig. 11, is an elevation of another modification of the beater.

Fig. 12, is a plan sectional view on line Z. Z. Fig. 11.

Numeral 2 represents the vessel made of any material and of any size or shape. This vessel is provided with a cover 3, made of any material and secured to the vessel or container in any approved manner.

The cover preferably has secured on top of it the bridge 4.

5 is the rotary screw spiral or twisted stem, comprising preferably a plurality of wires 6 suitably twisted together.

The upper end of each of these wires is formed with a shoulder 7, (see Figs. 5—6), which forms the reduced portions 10. The rotary screw spiral or twisted stem is first passed through the hole 8 of the cover; then the washer 9 is placed over the reduced portions 10, and upon the shoulders 7.

The bushing 11, is then placed over the reduced portions 10.

The bushing and the reduced portions 10 are then inserted into the orifice 12 of the bridge; and over the reduced portions 10 extending above the bridge, is placed the washer 13, (see Fig. 5). The reduced portions 10 above the washer are then separately bent over and down on the same which secures the screw to the bridge cover and provides a simple pivotal means for suspending the screw therefrom.

14 is the double acting or churning motor beater adapted to travel up or down on the screw, 5, in order to give the same a rotary back and forth motion. In order to accomplish this I provide the dasher with the cluster of openings 15 corresponding with the number of wires of the screw. (See Fig. 2). The dasher is also provided with orifices or openings 16 for aiding churning or beating.

The double acting or churning dasher is reciprocated up and down upon the rotary screw, spiral or twisted stem by means of operating rod 17, one end is fastened to the dasher at 18, (see Fig. 1), then carried up through suitable holes in the cover and bridge above the same where it is formed into a ring-handle 19, the other end 20 of the rod is then carried down through holes in bridge and cover to the other side of the dasher where it is fastened to the same in the same manner as shown at 18, in Fig. 1.

Instead of forming the rod 17 into the ring-handle 19 I may insert the ends thereof into a knob 21 (Fig. 7) and suitably fasten the same thereto.

22, are the beater arms, which preferably are formed out of the wires of the rotary screw 5 spiral or twisted stem in the following manner:

Two or more of the wires are bent outward from the body of the screw a certain distance underneath the dasher 14. They are carried upward straight to the top of the vessel where they are bent outward and then carried downward to about the bottom of the vessel, where their ends are carried inward and bent around the stem 23 of one of the wires of the rotary screw spiral or twisted stem (see Figs. 1–4). It will now be obvious that as the dasher 14 moves up and down on the screw 5 by means of the operating rods 17 it will rotate the beaters 22; thus a combined churning and beating action are produced which will mix or agitate the compound in the vessel more quickly and more thoroughly than could be done otherwise. It will also be observed that the beater and mixer is pivotally secured to the coverbridge; therefore to use it on a closed vessel as shown in Fig. 1 simply screw or set the cover thereon. Should however you desire to operate the beater within a shallow vessel like 24 Fig. 7, simply take hold of the bridge and plate 25 (which may be substituted for the cover) and let the end 23 of screw 5, rest on the bottom of said vessel.

The operation of the device is as follows:

The knob or handle is grasped by the operator and reciprocated up and down. The double acting or churning dasher which is connected with its steadying arms to said knob, will then rotate the rotary screw with its beater arms back and forth and simultaneously the said dasher will act upon the material in the container which passes back and forth through the openings in said dasher while the beater arms in their circular course around the dasher will act upon the material thrown from said dasher.

It will now be observed that I have produced a new and novel beater or mixer wherein the dasher acts as the motor to rotate the rotary screw with its arms, and simultaneously as beater or churner.

The modification shown in Fig. 8 comprises a change in the construction of the double acting or churning dasher, which in this case consists of one piece of wire 26 formed into a coil-dasher 27 (see Fig. 10), by first bending it triangularly around the rotary screw, twisted or spiral stem 30 (which (may) consists of a plurality of wires 31), or of flat stem as at 40 Fig. 11, then curved outwardly around itself (see Fig. 10). The free ends 28 of the dasher are then carried upwardly through cover and bridge openings after the manner of rods 17, Fig. 1 and similarly formed into a ring handle or inserted into a knob handle.

The rotary screw 30, spiral or twisted stem, Fig. 8, is also formed into beaters 32 by taking the wires 31 thereof and carrying them outward and upwardly in preferable three directions (see Fig. 9); their outer free ends may be suitably ornamented.

The modification shown in Fig. 11 consists in the formation of the rotary screw 40, twisted or spiral stem, which in this case is made out of a flat piece of metal suitably twisted. The screw is secured to the coverbridge by riveting the reduced end over same at 50; bushing and washers resting on the reduced part of screw the same as in Fig. 1.

42 are the beater arms of Fig. 11, which are made of a flat piece of metal shaped into a double U having slots in their lower members in order that they can be placed over the reduced end of the screw 40 at 44; and against the shoulder 54 thereof. A ferrule is then placed between, the lower members of the double U and over the reduced part of the screw. The end of the reduced portion of the screw projecting beyond the lower part of the double U is then riveted over (see Fig. 11.)

46 is the double acting or churning dasher of Fig. 11 made of a metal and provided with an elongated slot 47 (Fig. 12) and adapted to be reciprocated on the rotary screw, spiral or twisted stem 40 and rotate the same and the beater arms.

48 are the dasher operating arms secured to the dasher in the same manner as rods 17 of Fig. 1, and also similarly carried upward through openings in cover-bridge, and formed either into a ring-handle or inserted into a knob.

I am aware that the screw can be pivotally suspended from the cover proper as well as from the bridge without departing from my invention.

The beater arms may be shaped into any form for facilitating beating.

The object of the dasher arms 17 are to give the dasher a more steady movement on the screw.

What I claim is:—

1. In a beater or mixer, the combination of a guiding and supporting bridge, means for supporting said bridge, a spiral or twisted stem, said stem pivotally supported from said bridge and extending below said supporting means, beater arms projecting laterally and upwardly from the lower extremities of said stem, a motor-beater having openings and with said openings engagement with said stem, a plurality of operating or guiding rods extending upwardly from said motor beater and passing through and above said supporting means and said bridge, an operating handle formed out of the extremities of said rods above said bridge.

2. In a beater or mixer, the combination of a guiding and supporting bridge having orifices, means for supporting said bridge a spiral or twisted stem, said stem pivotally supported from said bridge and extending below said supporting means, a motor-beater having openings and with said openings engagement with said stem, beater arms projecting from the lower extremities of said stem laterally and upwardly beyond the circumference of said motor beater, a plurality of operating or guiding rods extending upwardly from said motor-beater and passing through said orifices and above said bridge, an operating handle formed on the ends of said rods above said bridge, a container said supporting means with said bridge adopted to rest on said container, said motor-beater adapted, by being reciprocated on said stem, to simultaneously churn and rotate said stems beater arms back and forth around its circumference in said container.

3. In a beater or mixer, the combination of a guiding and supporting bridge having orifices, a cover having apertures, said cover supporting said bridge, a spiral or twisted stem pivotally suspended from said bridge and extending through one of said apertures below said cover, a handle provided with guiding rods, said rods passing through said orifices of said bridge and through said apertures of said cover, a motor beater having a plurality of openings and with one of said openings engagement with said stem below said cover, said motor beater connected to the lower ends of said rods, beater arms projecting from the lower extremities of said stem laterally and upwardly beyond the circumference of said motor beater said motor beater adapted to be reciprocated on said stem in between said arms and while being reciprocated to beat and simultaneously rotate said stems beater arms around its circumference, said bridge to steady the reciprocating movement of said rods and the rotating of said stem.

Signed at New York in the county of New York and State of New York this 6th day of August, A. D. 1914.

PAUL TRIPKE.

Witnesses:
A. BARRETT,
MARTIN J. BEVANS.

Copies of this patent may be obtained for five cents each, by addressing the "Commissioner of Patents, Washington, D. C."